(12) United States Patent
Khosravi et al.

(10) Patent No.: US 10,069,826 B2
(45) Date of Patent: *Sep. 4, 2018

(54) SECURE SENSOR DATA TRANSPORT AND PROCESSING

(71) Applicant: Intel Corporation, Santa Clara, CA (US)

(72) Inventors: Hormuzd M. Khosravi, Portland, OR (US); Bassam N. Coury, Portland, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,091

(22) Filed: Sep. 19, 2017

(65) Prior Publication Data
US 2018/0026981 A1 Jan. 25, 2018

Related U.S. Application Data

(63) Continuation of application No. 14/865,258, filed on Sep. 25, 2015, now Pat. No. 9,769,169.

(51) Int. Cl.
*H04L 29/00* (2006.01)
*H04L 29/06* (2006.01)

(52) U.S. Cl.
CPC ...... *H04L 63/0876* (2013.01); *H04L 63/0861* (2013.01); *H04L 63/102* (2013.01)

(58) Field of Classification Search
CPC .................................................. H04L 63/0876
See application file for complete search history.

(56) References Cited

U.S. PATENT DOCUMENTS 6,138,239 A * 10/2000 Veil .................. G06F 21/572
  713/156
9,030,321 B2 * 5/2015 Breed .................... B60T 1/005
  340/539.17

(Continued)

FOREIGN PATENT DOCUMENTS

WO 2015-099697 A1 7/2015
WO 2015-126135 A1 8/2015

OTHER PUBLICATIONS

International Search Report and Written Opinion issued in PCT Application No. PCT/US2016/048760, dated Nov. 22, 2016.

(Continued)

*Primary Examiner* — Ali Shayanfar
(74) *Attorney, Agent, or Firm* — Grossman, Tucker, Perreault & Pfleger, PLLC

(57) ABSTRACT

The present disclosure is directed to secure sensor data transport and processing. End-to-end security may prevent attackers from altering data during the sensor-based security procedure. For example, following sensor data capture execution in a device may be temporarily suspended. During the suspension of execution, sensor interface circuitry in the device may copy the sensor data from a memory location associated with the sensor to a trusted execution environment (TEE) within the device. The TEE may provide a secure location in which the sensor data may be processed and a determination may be made as to whether to grant access to the secure resources. The TEE may comprise, for example, match circuitry to compare the sensor data to previously captured sensor data for users that are allowed to access the secured resources and output circuitry to grant access to the secured resources or to perform activities associated with a security exception.

20 Claims, 4 Drawing Sheets

(56) References Cited

U.S. PATENT DOCUMENTS

| | | | |
|---|---|---|---|
| 9,176,752 B1* | 11/2015 | Marr | G06F 9/4411 |
| 9,332,018 B2* | 5/2016 | Liebl, III | G06F 21/31 |
| 9,582,127 B2* | 2/2017 | Vandermeijden | G06F 3/044 |
| 9,769,169 B2* | 9/2017 | Khosravi | H04L 63/0876 |
| 9,807,610 B2* | 10/2017 | Rasheed | H04L 9/3215 |
| 2003/0023882 A1 | 1/2003 | Udom et al. | |
| 2004/0143719 A1* | 7/2004 | Nguyen | G06F 11/2284 |
| | | | 711/202 |
| 2007/0150589 A1* | 6/2007 | Kim | G06F 8/60 |
| | | | 709/224 |
| 2007/0162238 A1 | 7/2007 | Jeansonne et al. | |
| 2009/0000831 A1* | 1/2009 | Miller | G06F 3/03545 |
| | | | 178/19.01 |
| 2010/0058055 A1* | 3/2010 | Hair | G06F 21/10 |
| | | | 713/165 |
| 2010/0077473 A1 | 3/2010 | Ohta et al. | |
| 2013/0304276 A1* | 11/2013 | Flies | G06F 17/00 |
| | | | 701/1 |
| 2014/0075496 A1 | 3/2014 | Prakash et al. | |
| 2014/0148115 A1* | 5/2014 | Ibbotson | H04W 24/04 |
| | | | 455/404.1 |
| 2014/0173152 A1 | 6/2014 | Kegel | |
| 2014/0195815 A1 | 7/2014 | Taveau et al. | |
| 2015/0121516 A1 | 4/2015 | Korkishko et al. | |
| 2015/0163206 A1* | 6/2015 | McCarthy | G06F 21/6227 |
| | | | 713/171 |
| 2016/0014159 A1* | 1/2016 | Schrecker | H04L 63/0869 |
| | | | 726/1 |
| 2016/0066184 A1* | 3/2016 | Bhargav-Spantzel | G06F 21/40 |
| | | | 726/7 |
| 2016/0092382 A1* | 3/2016 | Anvin | G11C 7/1072 |
| | | | 710/269 |
| 2016/0180078 A1* | 6/2016 | Chhabra | G06F 21/31 |
| | | | 726/19 |
| 2016/0182240 A1* | 6/2016 | Nayshtut | H04L 9/3268 |
| | | | 713/158 |
| 2016/0188853 A1* | 6/2016 | Smith | G06F 21/53 |
| | | | 726/19 |
| 2016/0283937 A1* | 9/2016 | Reese | G06Q 20/3829 |
| 2016/0284035 A1* | 9/2016 | Muttik | G06Q 50/18 |
| 2016/0328561 A1 | 11/2016 | Tamir et al. | |
| 2016/0350534 A1* | 12/2016 | Poornachandran | G06F 21/57 |
| 2017/0091434 A1* | 3/2017 | Proulx | G06F 21/32 |
| 2017/0181248 A1* | 6/2017 | Sarangdhar | G06F 21/32 |

OTHER PUBLICATIONS

Office Action issued in U.S. Appl. No. 14/865,258, dated Dec. 20, 2016, 18 pages.

Notice of Allowance issued in U.S. Appl. No. 14/865,258, dated May 16, 2017, 23 pages.

International Preliminary Report on Patentability and Written Opinion issued in PCT Application No. PCT/US2016/048760, dated Apr. 5, 2018, 10 pages.

* cited by examiner

SECURE SENSOR DATA TRANSPORT AND PROCESSING

CROSS-REFERENCE TO RELATED APPLICATION

The present application is a continuation of U.S. patent application Ser. No. 14/865,258 filed Sep. 25, 2015, the entire disclosure of which is incorporated herein by reference.

TECHNICAL FIELD

The present disclosure relates to user authentication, and more particularly, to a system that may provide end-to-end security for user authentication and access permission operations.

BACKGROUND

The protection of device and data integrity has become essential as common interactions are increasingly performed via electronic communication. For example, users may execute data and financial transactions, business-related transactions, etc. utilizing electronic communication. In these interactions confidential information may be transmitted to other devices in a network such as a global area network (GAN), a wide area network (WAN) like the Internet, a local area network (LAN). Confidential information may also be received from other devices in a network and stored on a user's device. As a result, devices may comprise confidential information for the user of the device and possibly other users. Over time the confidential information may grow to include personal identification data, medical/health data, financial data, residence data, account numbers, passwords, professional information such as registration/license data, office location, contact data, client data, etc. Certain attackers having possibly malicious intent (e.g., hackers) may desire to obtain this type of information to utilize for their own benefit, sell to others, etc.

This increasing threat to device and data integrity has driven equipment manufacturers, software developers, etc. to improve security. As new protections emerge, hackers have devised creative ways to overcome them. As a result, designers are constantly seeking more impregnable forms of security. Biometrics is one form of security that is difficult to fool (e.g., spoof) because the security is based on sensing characteristics of a user's body to generate sensor data each time the user desires access to secure resources. Examples of biometric-based security may include, but are not limited to, fingerprint scanning, retina scanning, iris recognition, ear recognition, face recognition, vein mapping, voice detection, etc. In an example of operation, approved users may record biometric data, and each time the user desires to access a secured resource new biometric data may be captured from the user to compare to the previous sample. Conceptually speaking, biometric identification and access control may appear to be secure, but hackers are continually devising ways to overcome the access control system at various vulnerable points occurring between the initial biometric data capture operation and the final determination to grant access.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
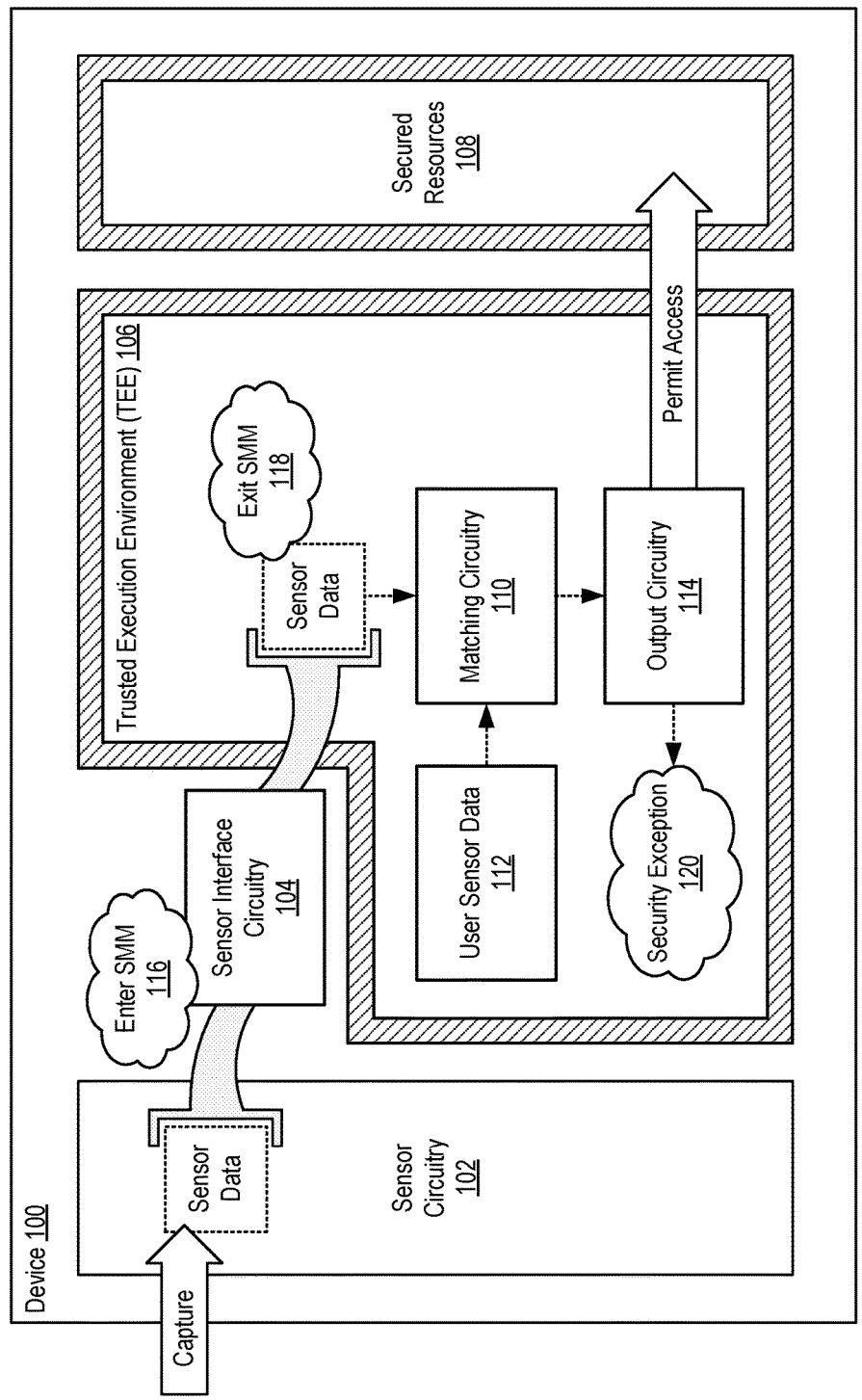
FIG. 1 illustrates an example of a device able to perform secure sensor data transport and processing in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to secure sensor data transport and processing. Sensor-driven security, such as security based on biometrics, may suffer from a variety of vulnerabilities occurring between sensor data capture and access permission determination. Attackers may, for example, intercept/modify sensor data, replay old sensor data, synthesize biometric data features, intercept/modify data corresponding to known good users, override final access determinations, etc. Consistent with the present disclosure, end-to-end security may be provided to ensure that an attacker cannot alter data throughout the entire sensor-based security procedure. For example, following sensor data capture execution in a device may be temporarily suspended. During the suspension of execution, sensor interface circuitry in the device may copy the sensor data from a memory location associated with the sensor to a trusted execution environment (TEE) within the device. The TEE may provide a secure location in which the sensor data may be processed and a determination may be made as to whether to grant access to the secure resources. The TEE may comprise, for example, match circuitry to compare the sensor data to previously captured sensor data for users that are allowed to access the secured resources and output circuitry to grant access to the secured resources or to perform activities associated with a security exception.

In at least one embodiment, a device including sensor-based security may comprise, for example, secured resources, sensor circuitry, memory circuitry and processing circuitry. The sensor circuitry may be to generate sensor data. The memory circuitry may include at least a TEE having access control circuitry therein to control access to the secured resources based on the sensor data. The processing circuitry may be to cause execution in the device to be temporarily suspended and to transfer the sensor data from a memory location in the memory circuitry associated with the at least one sensor to a memory location within the TEE during the temporary suspension.

In at least one embodiment, the processor may be to cause normal execution in the device to be temporarily suspended by causing the device to enter system management mode (SMM). The device may further comprise at least an operating system (OS) including at least a sensor driver to notify the processing circuitry that sensor data has been generated. The sensor driver may be to send a message to a boot code runtime application program interface loaded into the memory circuitry during device boot up. The device may further comprise at least sensor interface circuitry to access the memory location associated with the at least one sensor and transfer the sensor data. The memory location associated with the at least one sensor may be fixed in the memory circuitry, and the processing circuitry may be to provide the memory location associated with the at least one sensor to the sensor interface circuitry during device boot up.

In at least one embodiment, the at least one sensor may include a biometric sensor to capture biometric data from a user of the device seeking access to the secured resources. The access control circuitry may comprise at least matching circuitry to compare the sensor data to previously captured sensor data for users permitted to access the secured resources and output a match determination based on the comparison. The previously captured sensor data for users permitted to access the secured resources may be stored within the TEE. The access control circuitry may further comprise at least output circuitry to permit the user to access the secured resources or perform at least one activity associated with a security exception based on the match determination. The TEE may be based on, for example, at least one of Secure Guard Extensions (SGX) technology or Management Engine (ME) technology. Consistent with the present disclosure, a method for sensor-based security may comprise, for example, triggering a secured resource access protocol in a device, capturing sensor data using at least one sensor in the device, causing processing circuitry in the device to temporarily suspend execution and causing the processing circuitry to transfer the sensor data from a memory location in memory circuitry in the device associated with the at least one sensor to a memory location in a TEE in the memory circuitry during the temporary suspension.

FIG. 1 illustrates an example of a device able to perform secure sensor data transport and processing in accordance with at least one embodiment of the present disclosure. While various implementations are discussed herein employing technologies such as, but not limited to, SMM, SGX and ME technology including, for example, a Converged Security ME (CSME) developed by the Intel Corporation, the capturing of biometric data via at least one sensor for use in user authentication, etc., these particular technologies are offered merely as readily comprehensible examples from which the various apparatuses, systems, methodologies, etc. discussed herein may be understood.

Device 100 may be an apparatus able to at least sense data and process data. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

As shown in FIG. 1, device 100 may comprise, for example, at least sensor circuitry 102, sensor interface circuitry 104, TEE 106 and secured resources 108. While device 100 is pictured as a single apparatus, device 100 may actually be constructed from a combination of similarly-configured devices (e.g., a group of rack or edge servers) or differently-configured devices (e.g., a device including at least one sensor and a separate data processing device). For example, one or more of sensor circuitry 102, sensor interface circuitry 104, TEE 106 and secured resources 108 may reside in a separate device. Sensor circuitry 102 may comprise at least one sensor and any circuitry and/or software required to support the at least one sensor. In at least one example implementation the at least one sensor may capture biometric data corresponding to at least one characteristics of a user's anatomy. Example biometric sensors may include, but are not limited to, fingerprint scanning, retina scanning, iris recognition, ear recognition, face recognition, vein mapping, voice detection, etc. These characteristics may be sensed by touch sensors, proximity sensors, audio capture sensors, image/video/depth capture sensors, motion sensors (e.g., speed, acceleration, etc.), orientation sensors, electrical characteristic sensors (e.g., resistance, voltage, current, etc.), magnetic sensors, temperature sensors, etc. While shown as part of device 100, sensor circuity 102 may be separate from device 100 and may interact with device 100 via wired and/or wireless communication. Sensor interface circuitry 104 may be, in general, equipment (e.g., hardware) and/or software configured to transfer (e.g., copy) sensor data from sensor data from sensor circuitry 102 to TEE 106. More detail regarding the makeup and/or operation of sensor interface circuitry 104 will be provided below in regard to FIG. 3.

In general, TEE 106 may comprise a set of computing resources that are secure such that programs executing within TEE 106, and any data associated with these executing programs, are isolated from other resources in device 100. Outside actors cannot be interfere with or observe the programs/data within TEE 106 during program execution with the exception that the program may be started or stopped and the associated data may be inserted or deleted. Any data leaving TEE 106 may be released in a controlled manner. In at least one example implementation, TEE 106 may utilize a technology to protect the integrity of device 100 and data stored within device 100 such as SGX or a CSME. For the sake of example, SGX may provide a secure, hardware-encrypted computation and information storage location within device 100, the contents of which cannot be deciphered by privileged code or even through the application of hardware probes to memory bus in device 100. When TEE 106 is protected by SGX, embodiments consistent with the present disclosure make it impossible for intruders to decipher the contents of TEE 106. Protected data cannot be observed outside of SGX, and thus, is inaccessible outside of SGX.

In an example implementation wherein TEE 106 is implemented using SGX, the identity of programs (e.g., based on a cryptographic hash measurement of each program's contents) may be signed and stored inside each program. When the programs are then loaded into TEE 106, the processor may verify that the measurement of the program is identical to the prior measurement embedded inside the program. The signature employed to sign the embedded measurement may also be verifiable because a public key may be available to verify the signature at program load time. Malware cannot tamper with the program because its verifiable measurement would also be altered. Malware also cannot spoof the signature because the signing key is secure with the program's author. Thus, the software may not be read, written to or altered by any malware. Data may also be protected in TEE 106. For example, known-good programs executing in TEE 106 may encrypt a variety of data such as keys, passwords, licenses, etc. so that only verified good programs may decrypt this data. TEE 106 may be unified or may be broken into separate occurrences of TEE 106 in device 100. Utilizing multiple separate instances of TEE 106 may require more resources in device 100, but may also provide better security because one instance of TEE 106 becoming compromised (e.g., corrupted) may not affect the integrity of the other instances of TEE 106, allowing unaffected instances to remain intact, functional, secure, etc.

Secured resources 108 may comprise, for example, equipment, applications, data, etc. that is protected by security measures in device 100. In general, secured resources 108 may not be accessed without being allowed permission by these security measures. For example, an attempt to access secured resources 108 may trigger a security protocol in device 100. The security protocol may cause device 100 to present prompts to a user of the device be scanned (e.g., to allow sensor circuitry 102 to generate sensor data through biometric scanning). In at least one embodiment, TEE 106 may comprise at least matching circuitry 110, user sensor data 112 and output circuitry 114. Matching circuitry 110 may be to attempt to match the sensor data generated by sensor circuitry 102 to previously captured sensor data for known good users stored in user sensor data 112. Matching circuitry 110 may output a match determination (e.g., whether the sensor data matches previously captured sensor data stored in user sensor data 112). Output circuitry 114 may be to perform activities in device 100 based on the matching determination.

In an example of operation, data capture may initially be triggered for sensor circuity 102 in device 100. Data capture may be triggered by, for example, a user trying to unlock device 100 (e.g., to cause a lock screen to disappear), unlock access to equipment, applications, data, etc. in device 100, etc. The capture of sensor data may cause device 100 to enter SMM as illustrated at 116. SMM may be an operational mode in device 100 wherein normal execution is temporarily suspended and certain "safe" software (e.g., a firmware runtime application, a hardware-assisted interpreter and/or debugger, etc.) may be executed at a high privilege level. SMM may only be entered through a system management interrupt (SMI), and is generally a mode of operation in which operations may be performed without interruption or interference from other resources on device 100 such as utilities, device drivers, the operating system (OS), etc. After entering SMM, sensor interface circuitry 104 may transfer sensor data from a memory location associated with sensor circuitry 102 to a memory location within TEE 106. In this manner, the sensor data may be transferred within a safe environment without any influence from possible malicious software (e.g., malware) that may reside in device 100. After the sensor data is transferred into TEE 106, device 100 may exit SMM as illustrated at 118 and matching circuitry 119 may attempt to match the sensor data that was just captured to previously captured sensor data in user sensor data 112. While not shown in FIG. 1, any processing that may be necessary for the sensor data (e.g., data filtering, data conversion, feature extraction, etc.) prior to the matching by executed by matching circuitry 110 may be performed by sensor circuitry 102 and/or data processing resources in TEE 106. Moreover, storing user sensor data 112 within TEE 106 may prevent malware, hackers, etc. from accessing and/or altering the prior sensor data utilized to determine known good users (e.g., users previously approved to access secured resources 108). Matching circuitry 110 may output a match determination, which may be used by output circuitry 114 to perform various activities. For example, if the match determination indicates that the sensor data is for a known good user then access to secured resources 108 may be permitted for the current user. Alternatively, if the match determination does not indicate a match, then at least one activity associated with security exception 120 may be performed. Activities may include, but are not limited to, notifying (e.g., via visible, audible and/or tactile feedback) the current user of a sensor data/user match failure, requesting the current user to reattempt authentication (e.g., by generating new biometric sensor data), increasing the protection for at least secured resources 108, deactivating device 100, etc.

Figure 2:
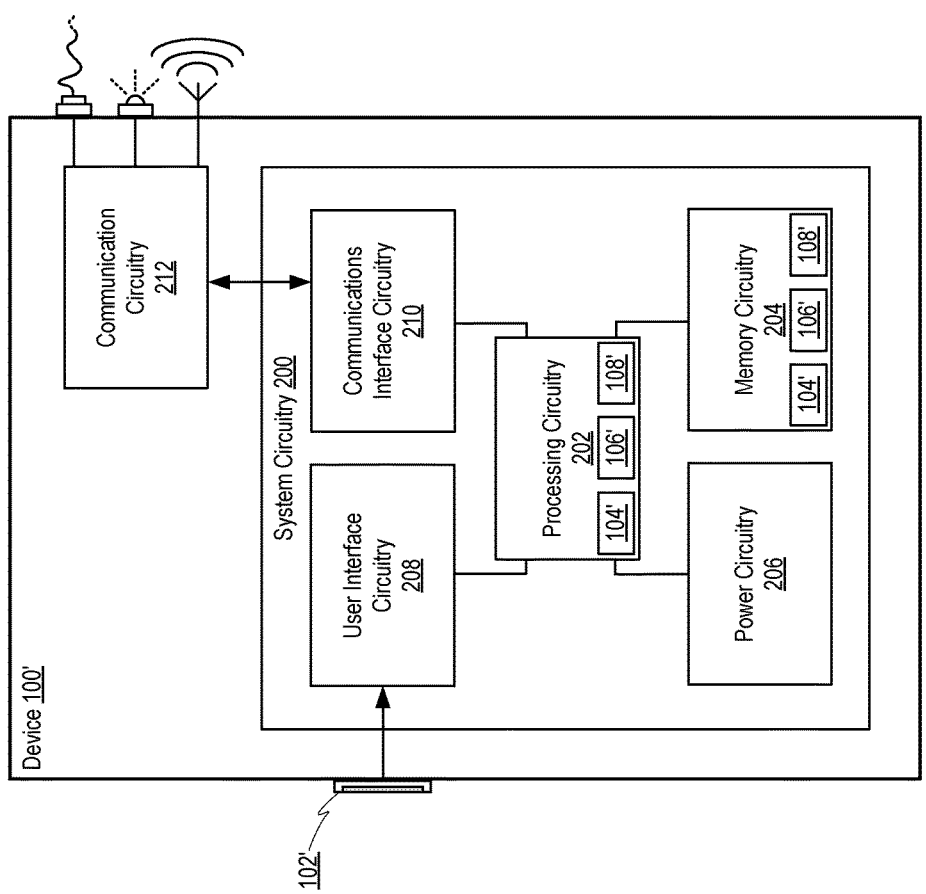
FIG. 2 illustrates an example configuration for a device usable in accordance with at least one embodiment of the present disclosure.

FIG. 2 illustrates an example configuration for a device usable in accordance with at least one embodiment of the present disclosure. Device 100 may be capable of performing any or all of the activities illustrated in FIG. 1. However, device 100 is presented only as an example of an apparatus usable in various embodiments consistent with the present disclosure, and is not intended to limit any of the various embodiments to any particular manner of configuration, implementation, etc. In addition, the inclusion of an apostrophe after an item number in a drawing figure (e.g., 100') may indicate that an example embodiment of the particular item is being shown. These example embodiments are not intended to limit the present disclosure to only what is illustrated, and have been presented herein merely for the sake of explanation.

Device 100' may comprise at least system circuitry 200 to manage device operation. System circuitry 200 may include, for example, processing circuitry 202, memory circuitry 204, power circuitry 206, user interface circuitry 208 and communications interface circuitry 210. Device 100' may further include communication circuitry 212. While communication circuitry 212 is shown as separate from system circuitry 200, the example configuration of device 100' has been provided herein merely for the sake of explanation. Some or all of the functionality associated with communication circuitry 212 may also be incorporated into system circuitry 200.

In device 100', processing circuitry 202 may comprise one or more processors situated in separate components, or alternatively one or more processing cores situated in one component (e.g., in an SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. Examples of support circuitry may include chipsets (e.g., Northbridge, Southbridge, etc. available from the Intel Corporation) configured to provide an interface via which processing circuitry 202 may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing circuitry 202 may be configured to execute various instructions in device 100'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within device 100' and/or may be coupled to device 100' via a wired or wireless communication medium. In an example implementation wherein device 100' is a multiple device system, user interface circuitry 208 may be optional in devices such as, for example, servers (e.g., rack/blade servers, etc.) that omit user interface circuitry 208 and instead rely on another device (e.g., an operator terminal) for user interface functionality.

Communications interface circuitry 210 may be configured to manage packet routing and other functionality for communication circuitry 212, which may include resources configured to support wired and/or wireless communications. In some instances, device 100' may comprise more than one set of communication circuitry 212 (e.g., including separate physical interface circuitry for wired protocols and/or wireless radios) managed by communications interface circuitry 210. Wired communications may include serial and parallel wired or optical mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound waves, lasers, etc. In one embodiment, communications interface circuitry 210 may be configured to prevent wireless communications that are active in communication circuitry 212 from interfering with each other. In performing this function, communications interface circuitry 210 may schedule activities for communication circuitry 212 based on, for example, the relative priority of messages awaiting transmission. While the embodiment disclosed in FIG. 2 illustrates communications interface circuitry 210 being separate from communication circuitry 212, it may also be possible for the functionality of communications interface circuitry 210 and communication circuitry 212 to be incorporated into the same circuitry.

Consistent with the present disclosure, sensor circuitry 102' may be a part of, or at least coupled to, user interface circuitry 208. Example sensor circuitry 102' is shown as a fingerprint reader in FIG. 2. Moreover, sensor interface circuitry 104', the circuitry identified in TEE 106' and secured resources 108' may comprise hardware, or combinations of hardware and software, configured to transport and process sensor data. "Hardware" as referenced herein, may include, for example, discrete analog and/or digital components (e.g., arranged on a printed circuit board (PCB) to form circuitry), at least one integrated circuit (IC), at least one group or set of ICs that may be configured to operate cooperatively (e.g., chipset), a group of IC functionality fabricated on one substrate (SoC), or combinations thereof. Thus, a hardware portion of sensor interface circuity 104', TEE 106' and/or secured resources 108' may reside in processing circuitry 202. In at least one example embodiment, part of at least the circuitry in TEE 106' and secured resources 108' may be composed of software (e.g., instructions, data, etc.) that, when loaded into RAM in memory circuitry 204, may cause processing circuitry 202 to transform from general purpose processing circuitry into specialized circuitry configured to perform certain functions based on the software portion of sensor interface circuity 104', TEE 106' and/or secured resources 108'.

Figure 3:
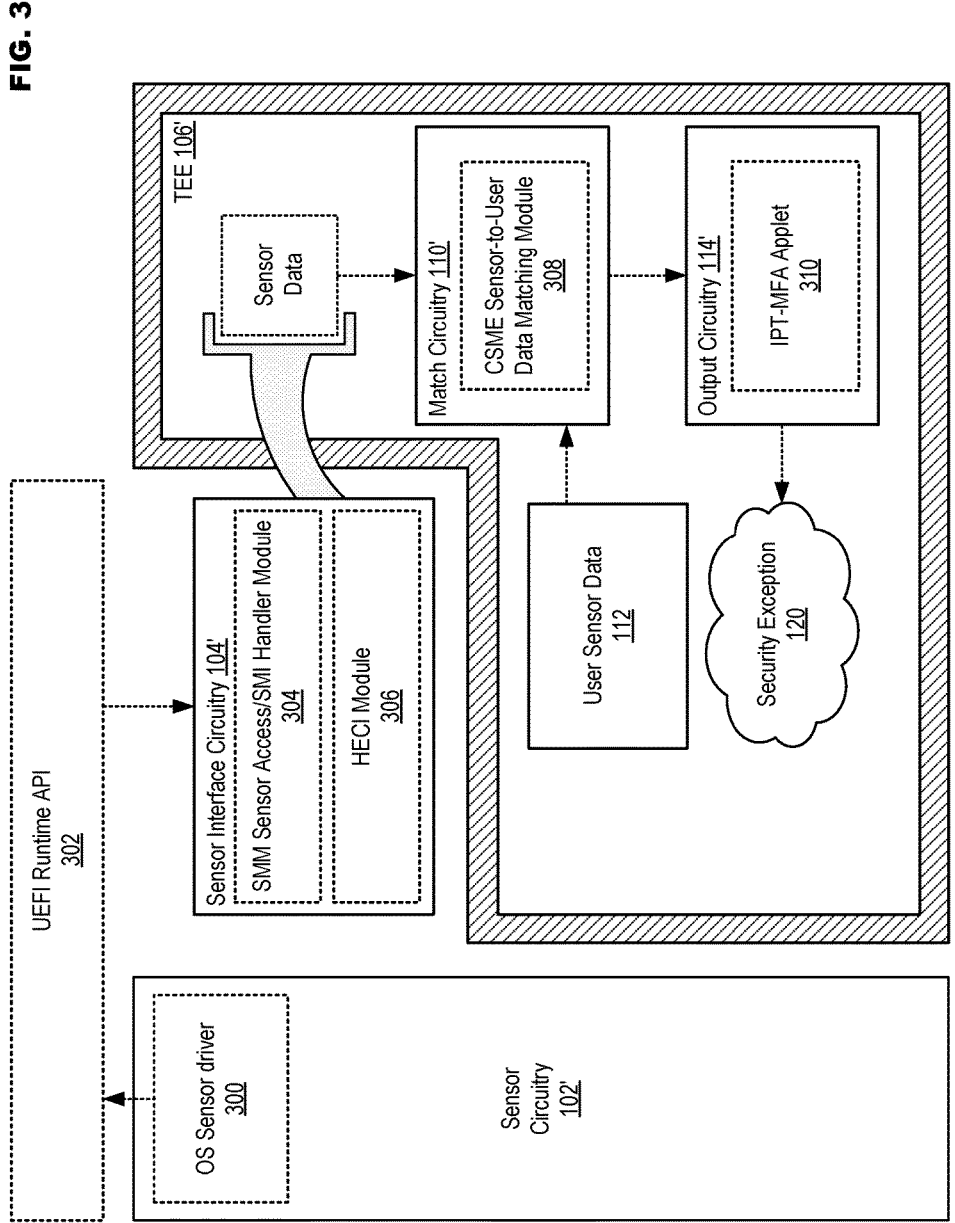
FIG. 3 illustrates example configurations for sensor circuitry and a trusted execution environment (TEE) in accordance with at least one embodiment of the present disclosure.

FIG. 3 illustrates example configurations for sensor circuitry and a TEE in accordance with at least one embodiment of the present disclosure. FIG. 3 discloses a practical example of how various embodiments consistent with the present disclosure may be implemented. The OS of device 100 may comprise at least OS sensor driver 300. For example, OS sensor driver 300 may be loaded into device 100 by firmware in device 100 during boot up. When sensor circuitry 102' captures sensor data, OS sensor driver 300 may notify UEFI runtime application program interface (API) 302. UEFI Runtime API 302 may, in turn, trigger an SMI to cause device 100 to enter SMM. In response to the SMI, SMM sensor access/SMI Handler module 304 may access a memory location associated with sensor circuitry 102'. In at least one embodiment, the memory location associated with sensor circuitry 102', and more particularly with OS sensor driver 300, may be fixed in memory circuitry 204 so that sensor interface circuitry 104' may know where to obtain the sensor data. The firmware in device 100 may inform SMM sensor access/SMI handler module 304 of the memory location associated with sensor circuitry 102' during device boot up. After the memory location associated with sensor circuity 102' has been accessed by SMM sensor access/SMI handler module 304, host embedded controller interface (HECI) module 306 may proceed to copy sensor data from the memory location associated with sensor circuitry 102' to a memory location in TEE 106' over the HECI. The HECI may include a communication bus to facilitate interaction between the OS, a CSME, etc. and other device systems. The CSME may be a hardware-based protection system comprising a secure IC or chipset to perform control and security operations in device 100 (e.g., including some or all of the functionality in TEE 106').

After the data is copied into TEE 106', CSME sensor-to-user data matching module 308 in match circuitry 110' may compare the sensor data captured by sensor circuitry 102' to sensor data corresponding to authorized users stored in user sensor data 112. Output circuitry 114' may comprise at least an identity protection technology with multifactor authentication (IPT-MFA) applet 310 (e.g. a small application, program stub, etc.) to receive a match determination from the CSME sensor-to-user data matching module 308 and to perform at least one activity related to the match determination. In at least one embodiment, IPT-MFA applet 310 may consider multiple factors for user authentication such as, but not limited to, user login (e.g., password), more than one type of biometric data, user challenges, device location (e.g., absolute or relative positioning equipment may be employed to determine whether the device is in a familiar location like an office, a home, etc.), the detection of other known proximate devices, etc. Authentication that is based on a combination of two or more factors may provide higher assurance that the user is the actual person whom he/she purports to be. It is much harder for malware and/or a hacker to impersonate an authorized user when more than one authentication factor must be intercepted, altered, spoofed, etc. The various embodiments disclosed herein may bolster or harden the IPT-MFA methodology because it becomes harder for malware and/or a hacker to intercept, change, etc. any data related to sensor-based authentication operations because the data is either moved in a protected manner (e.g., in SMM) or processed in a protected manner (e.g., within TEE 106').

Figure 4:
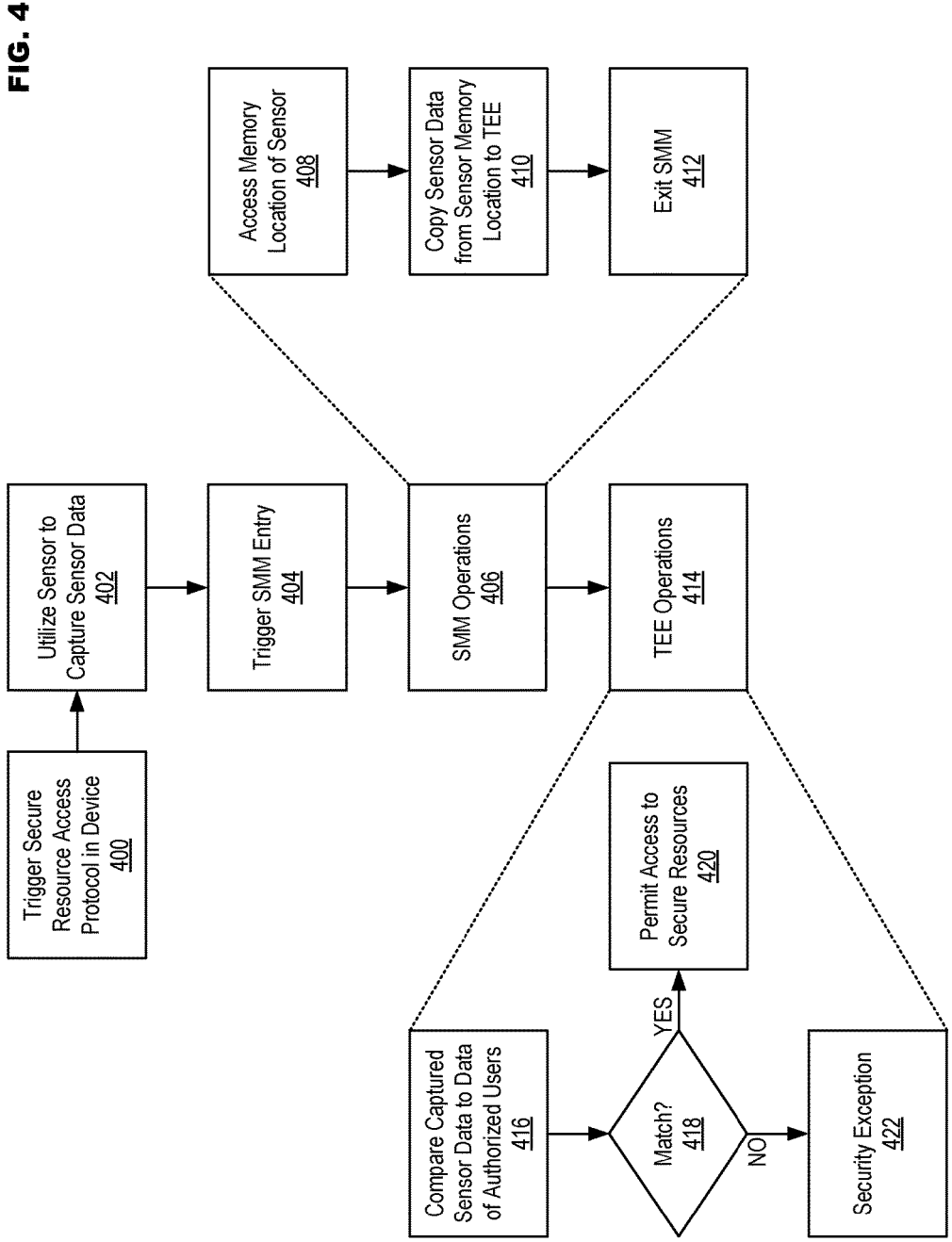
FIG. 4 illustrates example operations for secure sensor data transport and processing in accordance with at least one embodiment of the present disclosure.

FIG. 4 illustrates example operations for secure sensor data transport and processing in accordance with at least one embodiment of the present disclosure. In operation 400 a secure resource access protocol may be triggered in a device. The secure resource access protocol may be triggered by, for example, user interaction with the device, with an application on the device, with data on the device, etc. At least one sense in sensor circuitry in the device may then be used to capture sensor data (e.g., biometric data) in operation 402. Then device may then enter SMM in operation 404, which may be followed by SMM operations 406. SMM operations 406 may comprise operations 408 to 412 that may be performed while the device is in SMM. In operation 408 a memory location associated with the sensor circuitry may be accessed. Sensor data from the memory location associated with the sensor circuitry may be copied to a memory location in a TEE in the device in operation 410. The device may then exit from SMM in operation 412.

Following operation 406, and operations 408-412 associated therewith, TEE operations may take place in operation 414. TEE operations 414 may comprise operations 416 to 422 that may be performed within the TEE. In operation 416 the captured sensor data may be compared to previously captured sensor data to determine if there is a match. While not shown, prior to or during operation 416 any required data processing that may be required prior to the comparison (e.g., data filtering, data conversion, feature extraction, etc.) may be performed. A determination may then be made in operation 418 as to whether a match exists between the sensor data and an approved user. If in operation 418 it is determined that a match exists, then in operation 420 the use may be permitted to access the secured resources. On the other hand, if in operation 418 it is determined that the captured sensor data does match any known user, then in operation 422 at least one activity associated with a security exception may be performed. Example activities may include, but are not limited to, generating a notification to the user or another party of the authentication failure, requesting that the user reattempt authentication (e.g., capture new sensor data), increasing the level of security for the secured resources, deactivating the device, etc.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to secure sensor data transport and processing. End-to-end security may prevent attackers from altering data during the sensor-based security procedure. For example, following sensor data capture execution in a device may be temporarily suspended. During the suspension of execution, sensor interface circuitry in the device may copy the sensor data from a memory location associated with the sensor to a trusted execution environment (TEE) within the device. The TEE may provide a secure location in which the sensor data may be processed and a determination may be made as to whether to grant access to the secure resources. The TEE may comprise, for example, match circuitry to compare the sensor data to previously captured sensor data for users that are allowed to access the secured resources and output circuitry to grant access to the secured resources or to perform activities associated with a security exception.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for secure sensor data transport and processing.

According to example 1 there is provided a device including sensor-based security. The device may comprise secured resources, sensor circuitry to generate sensor data, memory circuitry including at least a trusted execution environment having access control circuitry therein to control access to the secured resources based on the sensor data and processing circuitry to cause execution in the device to be temporarily suspended and transfer the sensor data from a memory location in the memory circuitry associated with the at least one sensor to a memory location within the trusted execution environment during the temporary suspension.

Example 2 may include the elements of example 1, wherein the processor is to cause normal execution in the device to be temporarily suspended by causing the device to enter system management mode.

Example 3 may include the elements of any of examples 1 to 2, further comprising at least an operating system including at least a sensor driver to notify the processing circuitry that sensor data has been generated.

Example 4 may include the elements of example 3, wherein the sensor driver is to send a message to a boot code runtime application program interface loaded into the memory circuitry during device boot up.

Example 5 may include the elements of any of examples 1 to 4, further comprising at least sensor interface circuitry to access the memory location associated with the at least one sensor and transfer the sensor data.

Example 6 may include the elements of example 5, wherein the sensor interface circuitry comprises at least system management mode interrupt handling circuitry and host embedded controller interface circuitry.

Example 7 may include the elements of any of examples 5 to 6, wherein the memory location associated with the at least one sensor is fixed in the memory circuitry, and the processing circuitry is to provide the memory location associated with the at least one sensor to the sensor interface circuitry during device boot up.

Example 8 may include the elements of any of examples 1 to 7, wherein the at least one sensor includes a biometric sensor to capture biometric data from a user of the device seeking access to the secured resources.

Example 9 may include the elements of example 8, wherein the access control circuitry comprises at least matching circuitry to compare the sensor data to previously captured sensor data for users permitted to access the secured resources and output a match determination based on the comparison.

Example 10 may include the elements of example 9, wherein the matching circuitry comprises converged security management engine circuitry including at least a sensor-to-user data matching module.

Example 11 may include the elements of any of examples 9 to 10, wherein the previously captured sensor data for users permitted to access the secured resources is stored within the trusted execution environment.

Example 12 may include the elements of any of examples 9 to 11, wherein the access control circuitry comprises at least output circuitry to permit the user to access the secured resources or perform at least one activity associated with a security exception based on the match determination.

Example 13 may include the elements of example 12, wherein the output circuitry includes at least an identity protection technology with multifactor authentication applet.

Example 14 may include the elements of any of examples 12 to 13, wherein the at least one activity comprises at least one of a notifying the user, requesting sensor data be recaptured, causing a level of security for the secured resources to be increased or causing the device to shut down.

Example 15 may include the elements of any of examples 1 to 14, wherein the trusted execution environment is based on at least one of Secure Guard Extensions (SGX) technology or Management Engine (ME) technology.

Example 16 may include the elements of any of examples 1 to 15, wherein the processing circuitry is to resume normal execution after the transfer the sensor data from a memory location in the memory circuitry associated with the at least one sensor to a memory location within the trusted execution environment.

According to example 17 there is provided a method for sensor-based security. The method may include triggering a secured resource access protocol in a device, capturing sensor data using at least one sensor in the device, causing processing circuitry in the device to temporarily suspend execution and causing the processing circuitry to transfer the sensor data from a memory location in memory circuitry in the device associated with the at least one sensor to a memory location in a trusted execution environment in the memory circuitry during the temporary suspension.

Example 18 may include the elements of example 17, wherein transferring the sensor data comprises accessing the memory location associated with the at least one sensor and copying the sensor data from the memory location associated with the at least one sensor to the memory location in a trusted execution environment.

Example 19 may include the elements of any of examples 17 to 18, wherein the at least one sensor includes a biometric sensor to capture biometric data from a user of the device seeking access to the secured resources.

Example 20 may include the elements of example 19, and may further comprise determining, within the trusted execution environment, whether to permit the user to access the secured resources in the device based on the sensor data.

Example 21 may include the elements of example 20, wherein determining, within the trusted execution environment, whether to permit a user to access the secured resources comprises comparing the sensor data to previously captured sensor data for users permitted to access the secured resources, outputting a match determination based on the comparison and permitting the user to access the secured resources or performing at least one activity associated with a security exception based on the match determination.

Example 22 may include the elements of example 21, wherein the at least one activity comprises at least one of a notifying the user, requesting sensor data be recaptured, causing a level of security for the secured resources to be increased or causing the device to shut down.

Example 23 may include the elements of any of examples 20 to 22, wherein determining, within the trusted execution environment, whether to permit a user to access the secured resources comprises comparing the sensor data to previously captured sensor data for users permitted to access the secured resources and outputting a match determination based on the comparison.

Example 24 may include the elements of example 23, wherein the previously captured sensor data for users permitted to access the secured resources is stored within the trusted execution environment.

Example 25 may include the elements of any of examples 23 to 24, and may further comprise permitting the user to access the secured resources or performing at least one activity associated with a security exception based on the match determination.

Example 26 may include the elements of any of examples 17 to 25, and may further comprise resuming normal execution after the transfer the sensor data from a memory location in the memory circuitry associated with the at least one sensor to a memory location within the trusted execution environment.

According to example 27 there is provided a system including at least one device, the system being arranged to perform the method of any of the above examples 17 to 26.

According to example 28 there is provided a chipset arranged to perform the method of any of the above examples 17 to 26.

According to example 29 there is provided at least one machine readable medium comprising a plurality of instructions that, in response to be being executed on a computing device, cause the computing device to carry out the method according to any of the above examples 17 to 26.

According to example 30 there is provided at least one device comprising sensor-based security, the at least one device being arranged to perform the method of any of the above examples 17 to 26.

According to example 31 there is provided a system for sensor-based security. The system may comprise means for triggering a secured resource access protocol in a device, means for capturing sensor data using at least one sensor in the device, means for causing processing circuitry in the device to temporarily suspend execution and means for causing the processing circuitry to transfer the sensor data from a memory location in memory circuitry in the device associated with the at least one sensor to a memory location in a trusted execution environment in the memory circuitry during the temporary suspension.

Example 32 may include the elements of example 31, wherein the means for transferring the sensor data comprise means for accessing the memory location associated with the at least one sensor and means for copying the sensor data from the memory location associated with the at least one sensor to the memory location in a trusted execution environment.

Example 33 may include the elements of any of examples 31 to 32, wherein the at least one sensor includes a biometric sensor to capture biometric data from a user of the device seeking access to the secured resources.

Example 34 may include the elements of example 33, and may further comprise means for determining, within the trusted execution environment, whether to permit the user to access the secured resources in the device based on the sensor data.

Example 35 may include the elements of example 34, wherein the means for determining, within the trusted execution environment, whether to permit a user to access the secured resources comprise means for comparing the sensor data to previously captured sensor data for users permitted to access the secured resources, means for outputting a match determination based on the comparison and means for permitting the user to access the secured resources or performing at least one activity associated with a security exception based on the match determination.

Example 36 may include the elements of example 35, wherein the at least one activity comprises at least one of a notifying the user, requesting sensor data be recaptured, causing a level of security for the secured resources to be increased or causing the device to shut down.

Example 37 may include the elements of any of examples 34 to 36, wherein the means for determining, within the trusted execution environment, whether to permit a user to access the secured resources comprise means for comparing the sensor data to previously captured sensor data for users permitted to access the secured resources and means for outputting a match determination based on the comparison.

Example 38 may include the elements of example 37, wherein the previously captured sensor data for users permitted to access the secured resources is stored within the trusted execution environment.

Example 39 may include the elements of any of examples 37 to 38, and may further comprise means for permitting the user to access the secured resources or perform at least one activity associated with a security exception based on the match determination.

Example 40 may include the elements of any of examples 31 to 39, and may further comprise means for resuming normal execution after the transfer the sensor data from a memory location in the memory circuitry associated with the at least one sensor to a memory location within the trusted execution environment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device including sensor-based security, comprising:
   secured resources;
   sensor circuitry to generate sensor data;
   memory circuitry including at least a trusted execution environment comprising access control circuitry to control access to the secured resources based on the sensor data, the access control circuitry including:
      matching circuitry to:
         compare the sensor data to previously captured sensor data for users permitted to access the secured resources; and
         output a match determination based on the comparison; and
      output circuitry to, based on the match determination:
         permit a user of the device to access the secured resources; or
         perform at least one activity associated with a security exception; and
   processing circuitry to:
      cause execution in the device to be temporarily suspended; and
      transfer the sensor data from a first memory location in the memory circuitry associated with the sensor circuitry to a second memory location within the trusted execution environment during the temporary suspension.

2. The device of claim 1, wherein the processing circuitry processor is to cause normal execution in the device to be temporarily suspended by causing the device to enter a system management mode.

3. The device of claim 1, further comprising at least an operating system including at least a sensor driver to notify the processing circuitry that sensor data has been generated.

4. The device of claim 3, wherein the sensor driver is further to send a message to a boot code runtime application program interface loaded into the memory circuitry during device boot up.

5. The device of claim 1, further comprising at least sensor interface circuitry to access the memory location associated with the sensor circuitry and transfer the sensor data.

6. The device of claim 5, wherein the sensor interface circuitry includes at least:
   system management interrupt (SMI) handling circuitry; and
   host embedded controller interface circuitry.

7. The device of claim 6, wherein the sensor circuitry includes a biometric sensor to capture biometric data from the user of the device.

8. The device of claim 5, wherein:
   the memory location associated with the sensor circuitry is fixed in the memory circuitry; and
   the processing circuitry is further to provide the memory location associated with the sensor circuitry to the sensor interface circuitry during device boot up.

9. The device of claim 1, wherein the previously captured sensor data for users permitted to access the secured resources is stored within the trusted execution environment.

10. The device of claim 1, wherein the trusted execution environment is based on at least one of Secure Guard Extensions (SGX) technology or Management Engine (ME) technology.

11. A method for sensor-based security, comprising:
   triggering a secured resource access protocol in a device;
   capturing sensor data using at least one sensor in the device;
   causing processing circuitry in the device to temporarily suspend execution; and
   causing the processing circuitry to transfer the sensor data from a first memory location in memory circuitry in the device associated with the at least one sensor to a second memory location in a trusted execution environment in the memory circuitry during the temporary suspension;
   comparing, within the trusted execution environment, the sensor data to previously captured sensor data for users permitted to access the secured resources;
   outputting, within the trusted execution environment, a match determination based on the comparison; and
   based on the match determination:
      permitting a user of the device to access the secured resources; or
      performing at least one activity associated with a security exception.

12. The method of claim 11, wherein the causing the processing circuitry to transfer the sensor data from a first memory location in memory circuitry in the device associated with the at least one sensor to a second memory location in a trusted execution environment in the memory circuitry during the temporary suspension comprises:
   accessing, via sensor interface circuitry, a first memory location in memory circuitry in the device associated with the at least one sensor; and
   copying, by the sensor interface circuitry, the sensor data from the first memory location to a second memory location in a trusted execution environment in the memory circuitry during the temporary suspension.

13. The method of claim 12, wherein:
   the first memory location is fixed in the memory circuitry; and
   the method further comprises causing the processing circuitry to provide the first memory location to the sensor interface circuitry during device boot up.

14. The method of claim 13, wherein the at least one sensor includes a biometric sensor to capture biometric data from the user of the device.

15. The method of claim 11, wherein the previously captured sensor data for users permitted to access the secured resources is stored within the trusted execution environment.

16. One or more non-transitory machine-readable storage devices having instructions stored thereon which, when executed by at least one processor, cause the at least one processor to perform operations for sensor-based security comprising:
   trigger a secured resource access protocol in a device;
   capture sensor data using at least one sensor in the device;
   temporarily suspend execution;
   transfer the sensor data from a first memory location in memory circuitry in the device associated with the at least one sensor to a second memory location in a trusted execution environment in the memory circuitry during the temporary suspension;

compare, within the trusted execution environment, the sensor data to previously captured sensor data for users permitted to access secured resources;

output, within the trusted execution environment, a match determination based on the comparison; and based on the match determination:
   permit a user of the device to access the secured resources; or
   perform at least one activity associated with a security exception.

17. The one or more non-transitory machine-readable storage devices of claim 16, wherein the instructions resulting in the operations transfer the sensor data from a first memory location in memory circuitry in the device associated with the at least one sensor to a second memory location in a trusted execution environment in the memory circuitry during the temporary suspension, when executed by the at least one processor, cause the at least one processor to perform additional operations comprising:
   access, via sensor interface circuitry, a first memory location in memory circuitry in the device associated with the at least one sensor; and
   copy the sensor data from the first memory location to a second memory location in a trusted execution environment in the memory circuitry during the temporary suspension.

18. The one or more non-transitory machine-readable storage devices of claim 17, wherein:
   the first memory location is fixed in the memory circuitry; and
   the instructions, when executed by the at least one processor, cause the at least one processor to perform additional operations comprising:
      provide the first memory location to the sensor interface circuitry during device boot up.

19. The one or more non-transitory machine-readable storage devices of claim 18, wherein the at least one sensor includes a biometric sensor to capture biometric data from the user of the device.

20. The one or more non-transitory machine-readable storage devices of claim 16, wherein the previously captured sensor data for users permitted to access the secured resources is stored within the trusted execution environment.

* * * * *